United States Patent
Kuribayashi

(10) Patent No.: US 7,127,903 B2
(45) Date of Patent: Oct. 31, 2006

(54) AIR CONDITIONER FOR USE IN VEHICLES

(75) Inventor: Masaru Kuribayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/374,054

(22) Filed: Feb. 27, 2003

(65) Prior Publication Data

US 2003/0213252 A1    Nov. 20, 2003

(30) Foreign Application Priority Data

May 17, 2002    (JP)    .............................. P2002-142234

(51) Int. Cl.
B60H 1/32    (2006.01)

(52) U.S. Cl. .......................................... 62/133; 62/244

(58) Field of Classification Search .................. 62/133, 62/236, 239, 244, 228.4, 323.4, 323.3, 230
See application file for complete search history.

(56) References Cited

U.S. PATENT DOCUMENTS

| | | | |
|---|---|---|---|
| 3,844,130 A | | 10/1974 | Wahnish |
| 5,896,750 A | * | 4/1999 | Karl |
| 5,945,808 A | * | 8/1999 | Kikuchi et al. |
| 6,048,288 A | * | 4/2000 | Tsujii et al. |
| 6,247,899 B1 | * | 6/2001 | Ban et al. .................... 417/16 |
| 6,329,772 B1 | * | 12/2001 | Ochiai et al. |
| 6,459,166 B1 | * | 10/2002 | Yanase et al. |
| 6,516,621 B1 | * | 2/2003 | Homan et al. |
| 6,543,243 B1 | * | 4/2003 | Mohrmann et al. ........... 62/230 |
| 2002/0056993 A1 | * | 5/2002 | Kennedy |
| 2002/0147531 A1 | * | 10/2002 | Egami et al. |

FOREIGN PATENT DOCUMENTS

| | | |
|---|---|---|
| DE | 19513710 A1 | 10/1995 |
| DE | 4432679 A1 | 3/1996 |
| DE | 19738250 A1 | 3/1999 |
| DE | 10318637 A1 | 11/2003 |
| EP | 0916531 A2 | 5/1999 |
| JP | 08-014145 | 1/1996 |
| JP | 2001-26214 | 1/2001 |
| JP | 2002201975 A * | 7/2002 |

* cited by examiner

Primary Examiner—Mohammad M. Ali
(74) Attorney, Agent, or Firm—Sughrue Mion, PLLC

(57) ABSTRACT

In an air conditioner for use in vehicles comprising a compressor that is connected to an engine driving a vehicle and operated by a driving force provided by the engine during operation of the engine, connection between the engine and the compressor is released in response to stopping of the engine, as well as an electric motor driving the compressor is connected to the compressor in response to stopping of the engine; and the compressor is operated by the electric motor during stopping of the engine.

15 Claims, 3 Drawing Sheets

AIR CONDITIONER FOR USE IN VEHICLES

BACKGROUND OF THE INVENTION

1. Field of the Invention

The present invention relates to an air conditioner for use in vehicles and, more particularly, to an air conditioner for use in vehicles comprising a compressor operated by an engine and by an electric motor during stopping of the engine.

2. Description of the Related Art

It is a recent trend to manufacture automobiles, which possess an idle stop function so as to meet requirements for improving fuel consumption of an automobile. However, because auxiliary machineries, which are driven by an engine during idle stop mode, are stopped, for example, a compressor of an air conditioner is also stopped. The idle stop in summer has a problem in commercial value from the viewpoint of comfort.

It may be an attempt to take measures of not performing the idle stop during operation of the air conditioner. This idea, however, is far from achieving an essential object of improving fuel consumption.

FIG. 6 shows another attempt in which the following measures are taken. In this attempt, a crank pulley 19 and a crank shaft are brought into disconnection by means of an electromagnetic clutch 20, and a motor generator 3 that starts an engine 1 or generates an electric power is operated as an electric motor by an inverter 21 during idle stop mode. Furthermore auxiliary machineries connected to a belt 2 are driven thereby eventually driving an air-conditioning compressor 11.

Nevertheless, this attempt needs to drive the other auxiliary machineries only for driving the vehicle air-conditioning compressor 11 resulting in a problem of a large unnecessary loss.

Moreover, since the motor generator 3 after having operated continuously is driven in a continuing manner during stopping of the vehicle, another problem exists in that a larger size is required in order to get a sufficient designing capacity for dealing with heat from the motor generator 3.

In a still further attempt, measures of driving a compressor for vehicles only by means of an electric motor without the compressor for vehicles being connected to an engine, is proposed. In this prior art, however, an inverter unit is required additionally in order to control the air-conditioning compressor for vehicles.

As described above, according to prior arts, any appropriate measure for operating an air conditioner for use in vehicles reasonably during stopping of the engine with a simple arrangement has not been proposed.

SUMMARY OF THE INVENTION

An object of the present invention is to obtain an air conditioner for use in vehicles capable of performing reasonably an air-conditioning function during stopping of an engine.

To accomplish the foregoing object, an air conditioner for use in vehicles according to the invention includes a compressor that is connected to an engine for driving a vehicle and operated by a driving force provided by the mentioned engine during operation of the mentioned engine. This air conditioner is characterized in that connection between the mentioned engine and the mentioned compressor is released in response to stopping of the mentioned engine, and that an electric motor for driving the mentioned compressor is connected to the mentioned compressor in response to stopping of the mentioned engine. The mentioned compressor is operated by the mentioned electric motor during stopping of the mentioned engine.

As a result, in this invention, an appropriate constitution employing an electric motor that is connected to a compressor and drives the compressor during stopping of the engine, enables to obtain an air conditioner for use in vehicles capable of performing reasonably an air-conditioning function during stopping of the engine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1.

Figure 1:
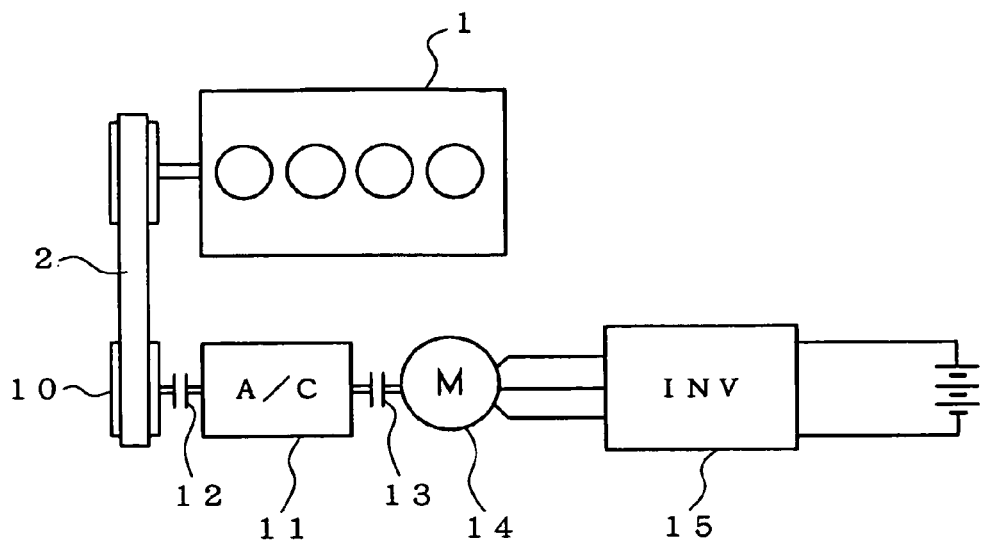
FIG. 1 is a block diagram showing a constitution of an air conditioner for use in vehicles according to a first preferred embodiment of the present invention.

A first preferred embodiment according to the present invention is hereinafter described referring to the drawings. FIG. 1 is a block diagram showing a constitution of an air conditioner for use in vehicles according to the first embodiment.

In the drawing, reference numeral 1 designates an engine, and numeral 2 designates a belt. Numeral 10 designates a pulley, and numeral 11 designates a compressor body. Numeral 12 designates a first electromagnetic clutch, and numeral 13 designates a second electromagnetic clutch. Numeral 14 designates an electric motor for driving the compressor, and numeral 15 designates an inverter unit energized by a DC power supply.

In the above constitution, the air-conditioning compressor 11 for vehicles is connected to the engine 1 via the belt 2, and operated by a driving force provided by the engine 1 during operation of the engine.

Connection/disconnection (engagement/disengagement) can be conducted by means of the first electromagnetic clutch 12 between the pulley 10 over which the belt 2 is applied and the compressor body 11, thereby enabling the compressor 11 to be disconnected from the pulley 10 in a state that any air-conditioning function is not required.

At the other terminal of this air-conditioning compressor 11 for vehicles, connection/disconnection can be conducted by means of the second electromagnetic clutch 13, and the electric motor 14 for driving the compressor 11 is connected thereto.

The above-mentioned electric motor 14 drives this vehicle air-conditioning compressor 11 while being in idle stop mode of the vehicle, and is controlled by the electric motor inverter unit 15.

Operations thereof are now described. In the case of performing an air-conditioning function during operation of the engine 1, the first electromagnetic clutch 12 of the vehicle air-conditioning compressor 11 is ON to provide connection between the vehicle air-conditioning compressor 11 and the pulley 10 thereof, and the compressor 11 receives a driving force via the belt 2 from the engine 1, whereby an air-conditioning refrigerant is compressed by the compressor 11.

As to operations of an air-conditioning function during idle stop mode, the first electromagnetic clutch 12 is OFF, and the second electromagnetic clutch 13 is ON, thereby providing connection between the vehicle air-conditioning compressor 11 and the electric motor 14. Further, the electric motor inverter unit 15 is brought into operation, thereby controlling the electric motor 14 to operate air-conditioning compressor 11 for vehicles.

In the first embodiment according to the invention, in an air conditioner for use in vehicles including a compressor 11 that is connected to an engine 1 for driving a vehicle and operated by a driving force provided by the mentioned engine 1 during operation of the mentioned engine 1, connection between the mentioned engine 1 and the mentioned compressor 11 is released in response to stopping of the mentioned engine 1. At the same time, an electric motor 14, which drives the mentioned compressor 11, is connected to the mentioned compressor 11 in response to stopping of the mentioned engine 1. Thus the mentioned compressor 11 is operated by the mentioned electric motor 14 during stopping of the mentioned engine 1. As a result, a constitution employing an electric motor that is connected to a compressor and drives the compressor during stopping of an engine enables to obtain an air conditioner for use in vehicles capable of performing reasonably an air-conditioning function during stopping of the engine.

Embodiment 2.

Figure 2:
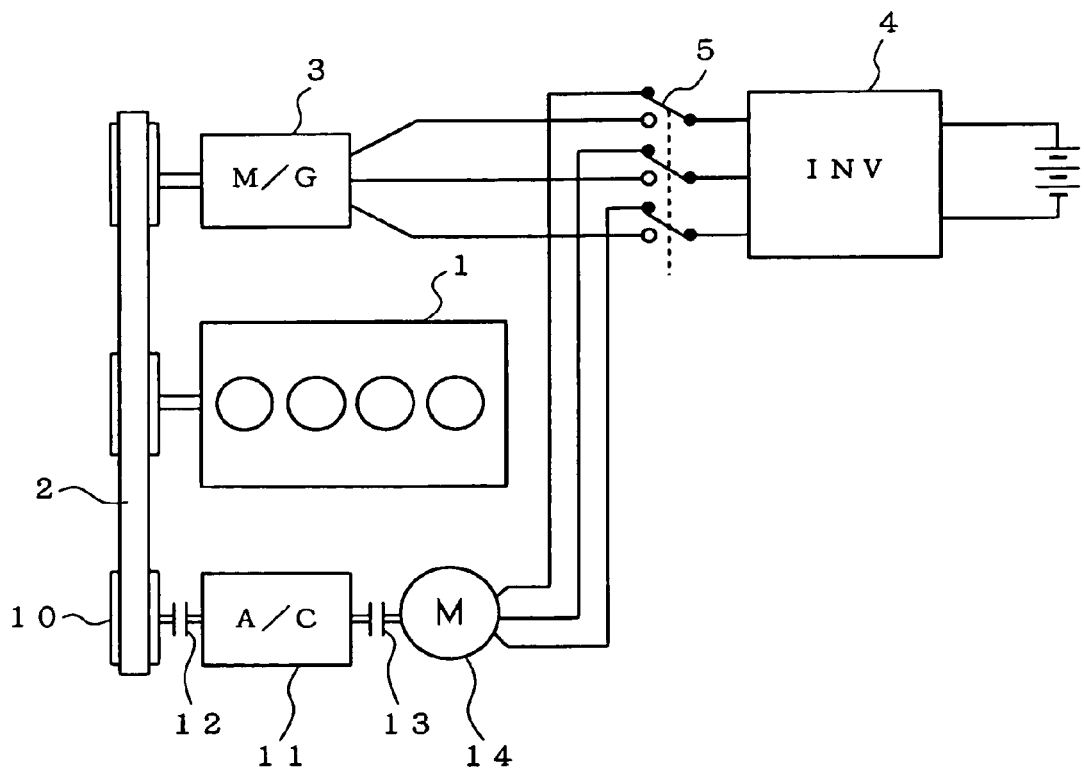
FIG. 2 is a block diagram showing a constitution of an air conditioner for use in vehicles according to a second embodiment of the invention.

A second preferred embodiment according to the invention is described with reference to FIG. 2. FIG. 2 is a block diagram showing a constitution of an air conditioner for use in vehicles according to the second embodiment.

In the drawing, numeral 1 designates an engine, and numeral 2 designates a belt. Numeral 3 designates a motor generator, numeral 4 designates an inverter unit energized by a DC power supply, and numeral 5 designates an open/close switch. Numeral 10 designates a pulley, and numeral 11 designates a compressor body. Numeral 12 designates a first electromagnetic clutch, and numeral 13 designates a second electromagnetic clutch. Numeral 14 designates an electric motor for driving the compressor.

A constitution shown herein is characterized in that, in a vehicle having an idle stop function and provided with the motor generator 3 for starting the engine 1 and generating an electric power during operation of the engine, the vehicle air-conditioning compressor 11 is controlled by the motor generator inverter unit 4 that controls the motor generator 3.

With reference to FIG. 2, the motor generator 3 is connected to the engine 1 via the belt 2, and acts to drive the engine as a motor when starting the engine, and generates a power during operation of the engine.

Further the motor generator 3 is connected to the motor generator inverter unit 4 that controls the motor generator 3.

The vehicle air-conditioning compressor 11 and the electric motor 14 having the same connection and function as in the foregoing first embodiment are connected to the above-mentioned motor generator inverter unit 4 via the open/close switch 5.

As for operations thereof, the motor generator inverter unit 4 is operated in order to control the motor generator 3 when starting the engine 1 and during power generating operation. On the other hand, the open/close switch 5 is operated, and the motor generator inverter unit 4 controls the electric motor 14 during idle stop mode and under the state of performing the air-conditioning function.

As described above, the motor generator inverter unit 4, which is paused during idle stop mode, is utilized as an inverter for controlling the electric motor 14 that drives the vehicle air-conditioning compressor 11. Accordingly, any dedicated inverter unit becomes unnecessary, thereby enabling to realize a great reduction in cost.

The motor generator according to this second embodiment employs a belt driven type. However, also with a motor generator of a type, which is connected directly to the crankshaft, the same advantage can be achieved.

In this second embodiment of the invention, in an air conditioner for use in vehicles comprising a compressor 11 that is connected to an engine 1 driving a vehicle and operated by a driving force provided by mentioned engine 1 during operation of mentioned engine 1, connection between mentioned engine 1 and mentioned compressor 11 is released in response to stopping of mentioned engine 1, as well as an electric motor 14, which drives mentioned compressor 11, is connected to mentioned compressor 11 in response to stopping of mentioned engine 1; and mentioned compressor 11 is operated by mentioned electric motor 14 during mentioned stopping of the engine 1. Further in the air conditioner for use in vehicles according to the second embodiment, there is provided a motor generator 3 that receives an electric power supply via an inverter 4 from a DC power supply to start mentioned engine 1, as well as that is driven by mentioned engine 1 during operation of mentioned engine 1 to perform a power generation function; and mentioned electric motor 14, which drives mentioned compressor 11, is connected to mentioned inverter 4 in response to stopping of mentioned engine 1, and receives an electric power supply via mentioned inverter 4. As a result, an appropriate constitution employing the motor generator inverter enables to obtain the air conditioner for use in vehicles capable of performing with reason an air-conditioning function during stopping of the engine.

Embodiment 3.

Figure 3:
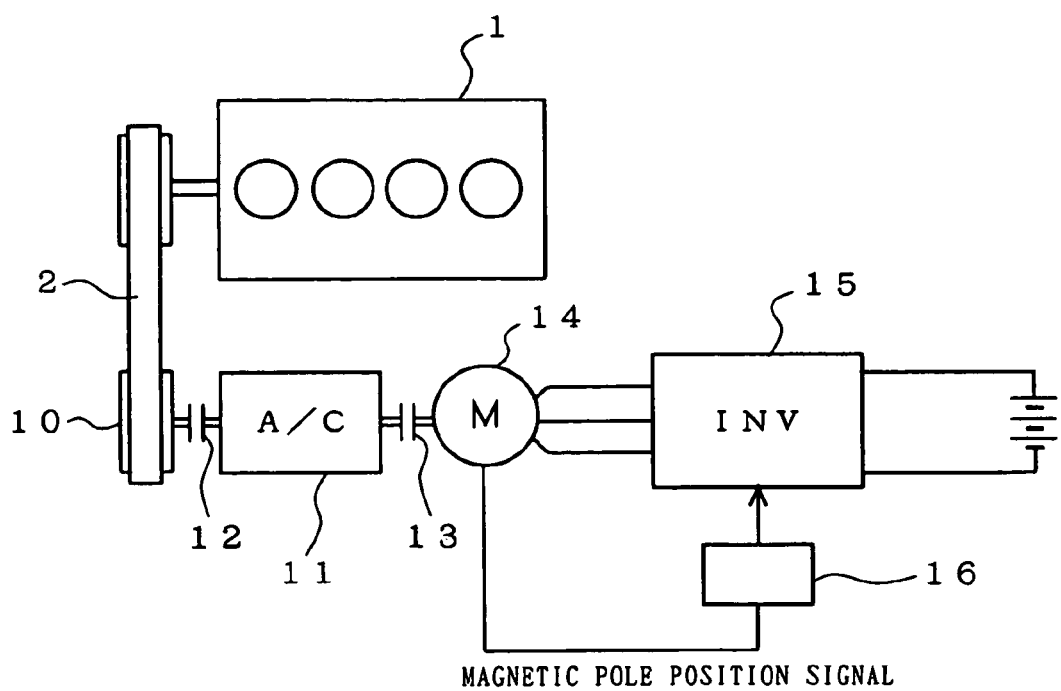
FIG. 3 is a block diagram showing a constitution of an air conditioner for use in vehicles according to a third embodiment of the invention.

A third preferred embodiment according to this invention is described with reference to FIG. 3. FIG. 3 is a block diagram showing constitution of an air conditioner for use in vehicles according to the third embodiment.

In the diagram, numeral 1 designates the engine, and numeral 2 designates the belt. Numeral 10 designates the pulley, and numeral 11 designates the compressor body. Numeral 12 designates the first electromagnetic clutch, and numeral 13 designates the second electromagnetic clutch. Numeral 14 designates the electric motor for driving the compressor. Numeral 15 designates the inverter unit energized by a DC power supply, and numeral 16 designates velocity control means.

Herein, the electric motor 14, which drives the vehicle air-conditioning compressor 11, contains therein a position sensor detecting a magnetic pole position of a rotor (not shown) of the electric motor 14, and signals from the position sensor are utilized.

A rotor velocity of the electric motor 14 is operated using the signals from this position sensor, and a feedback control with this operated rotor velocity is executed by the velocity control means 16 thereby enabling to control the electric motor 14, which drives the compressor 11, at a desirably optimum rotational speed.

According to the third embodiment of this invention, in an air conditioner for use in vehicles comprising a compressor 11 that is connected to an engine 1 driving a vehicle and operated by a driving force provided by mentioned engine 1 during operation of mentioned engine 1, connection between mentioned engine 1 and mentioned compressor 11 is released in response to stopping of mentioned engine 1, as well as an electric motor 14, which drives mentioned compressor 11, is connected to mentioned compressor 11 in response to stopping of mentioned engine 1; and mentioned compressor 11 is operated by mentioned electric motor 14 during mentioned stopping of the engine 1. Further in the air conditioner for use in vehicles according to the third embodiment, mentioned electric motor 14 is controlled in rotational speed by velocity control means 16, and drives mentioned compressor 11 at a predetermined rotational speed controlled by mentioned velocity control means 16 during mentioned stopping of the engine 1. As a result, an appropriate constitution comprising the electric motor driving the compressor at a predetermined rotational speed enables to obtain the air conditioner for use in vehicles capable of performing with reason an air-conditioning function during stopping of the engine.

Embodiment 4.

Figure 4:
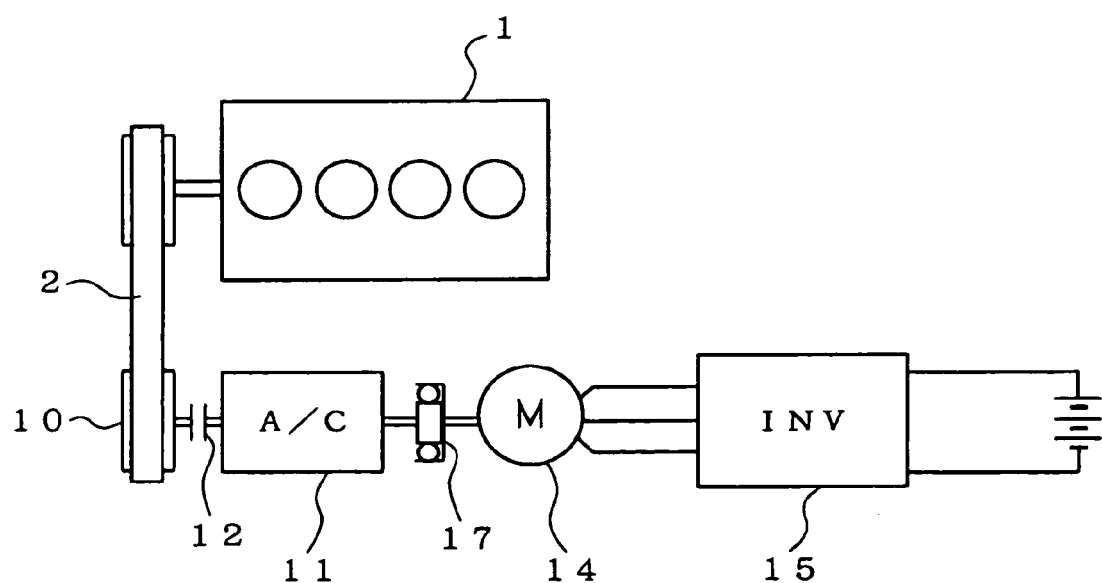
FIG. 4 is a block diagram showing a constitution of an air conditioner for use in vehicles according to a fourth embodiment of the invention.

A preferred embodiment according to this invention is described with reference to FIG. 4. FIG. 4 is a block diagram showing constitution of an air conditioner for use in vehicles according to the fourth embodiment.

In the diagram, numeral 1 designates the engine, and numeral 2 designates the belt. Numeral 10 designates the pulley, numeral 11 designates the compressor body, and numeral 12 designates the electromagnetic clutch. Numeral 14 designates the electric motor for driving the compressor. Numeral 15 designates the inverter unit energized by a DC power supply. Numeral 17 designates a one-way clutch.

The one-way clutch 17 provides connection between the above-mentioned vehicle air-conditioning compressor 11 and the electric motor 14, which drives the vehicle air-conditioning compressor 11. In the case where the vehicle air-conditioning compressor 11 is driven from the engine 1, the one-way clutch 17 is designed to be in a state of disconnection.

In the case of driving the vehicle air-conditioning compressor 11 with the electric motor 14, the one-way clutch 17 is connected thereby enabling an air-conditioning operation while in idle stop mode.

Thus, an electromagnetic clutch is not used while in idle stop mode so that electric power consumption can be reduced, and cost can also be reduced.

According to the fourth embodiment of this invention, in an air conditioner for use in vehicles comprising a compressor 11 that is connected to an engine 1 driving a vehicle and operated by a driving force provided by mentioned engine 1 during operation of mentioned engine 1, connection between mentioned engine 1 and mentioned compressor 11 is released in response to stopping of mentioned engine 1, as well as an electric motor 14, which drives mentioned compressor 11, is connected to mentioned compressor 11 in response to stopping of mentioned engine 1; and mentioned compressor 11 is operated by mentioned electric motor 14 during mentioned stopping of the engine 1 is being stopped. Further in the air conditioner for use in vehicles according to the fourth embodiment, there is provided a one-way clutch 17 providing connection between mentioned compressor 11 and mentioned electric motor 14 driving mentioned compressor 11; and mentioned one-way clutch 17 holds connection between mentioned compressor 11 and electric motor 14 when mentioned compressor 11 is driven by mentioned electric motor 14, and releases connection between mentioned compressor 11 and electric motor 14 when mentioned compressor 11 is driven by mentioned engine 1. As a result, an appropriate constitution capable of reducing an electric power consumption and cost with the use of the one-way clutch enables to obtain the air conditioner for use in vehicles capable of performing with reason an air-conditioning function during stopping of the engine.

Embodiment 5.

Figure 5:
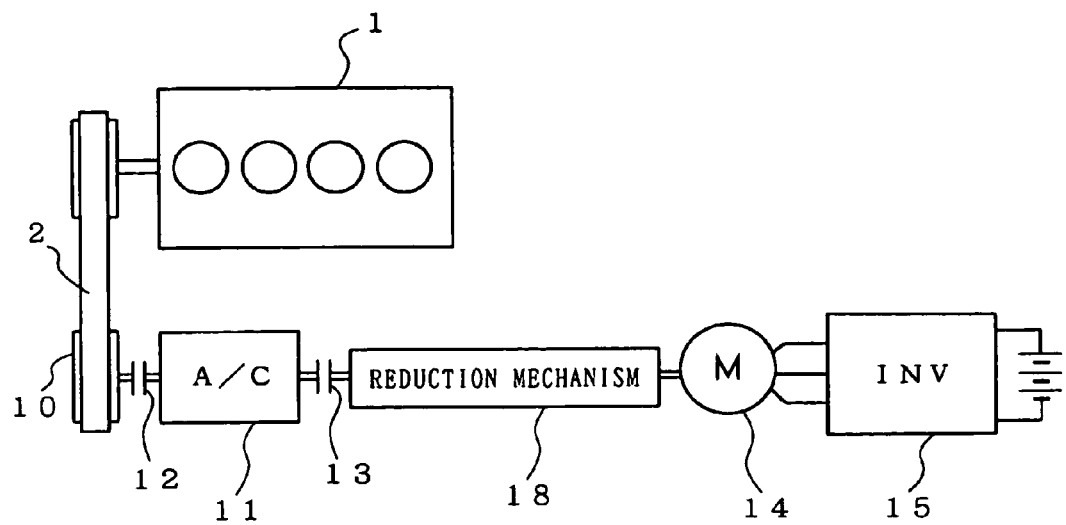
FIG. 5 is a block diagram showing a constitution of an air conditioner for use in vehicles according to a fifth embodiment of the invention.
Figure 6:
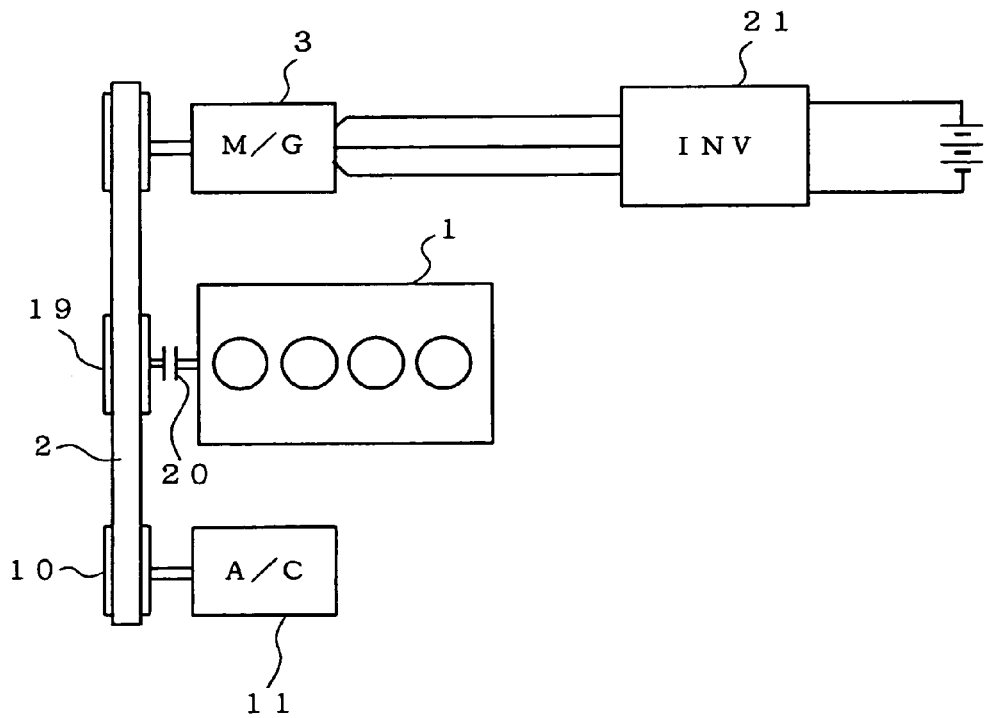
FIG. 6 is a block diagram showing a constitution of an air conditioner for use in vehicles according to a prior art.

A fifth preferred embodiment according to this invention is described with reference to FIG. 5. FIG. 5 is a block diagram showing constitution of an air conditioner for use in vehicles according to the fifth embodiment.

In the diagram, numeral 1 designates the engine, and numeral 2 designates the belt. Numeral 10 designates the pulley, and numeral 11 designates the compressor body. Numeral 12 designates the first electromagnetic clutch, and numeral 13 designates the second electromagnetic clutch. Numeral 14 designates the electric motor for driving the compressor, and numeral 18 designates a reduction mechanism.

The above-mentioned vehicle air-conditioning compressor 11 is connected to the electric motor 14, which drives the vehicle air-conditioning compressor 11, via the second electromagnetic clutch 13 and the reduction mechanism 17. In the case where the vehicle air-conditioning compressor 11 is driven from the engine (not shown), the second electromagnetic clutch 13 is disconnected.

This reduction mechanism 18 is designed so that an input rotational speed from the electric motor 14 may be reduced.

In the case of driving the vehicle air-conditioning compressor 11 with the electric motor 14, the second electromagnetic clutch 13 is connected as well as a driving force of the electric motor 14 is transmitted via the reduction mechanism 17 thereby enabling downsizing of the electric motor 14, and enabling to achieve improved mounting and a cost reduction.

According to the fifth embodiment of this invention, in an air conditioner for use in vehicles comprising a compressor 11 that is connected to an engine 1 driving a vehicle and operated by a driving force provided by mentioned engine 1 during operation of mentioned engine 1, connection between mentioned engine 1 and mentioned compressor 11 is released in response to stopping of mentioned engine 1, as well as an electric motor 14, which drives mentioned compressor 11, is connected to mentioned compressor 11 in response to stopping of mentioned engine 1; and mentioned compressor 11 is operated by mentioned electric motor 14 during mentioned stopping of the engine 1. Further in the air conditioner for use in vehicles according to the fifth embodiment, mentioned compressor 11 is connected to mentioned electric motor 14 driving mentioned compressor 11 via an electromagnetic clutch 13 and a reduction mechanism 18; and mentioned compressor 11 is driven by mentioned electric motor 14 via mentioned electromagnetic clutch 13 and reduction mechanism 18 during mentioned stopping of the engine 1. As a result, an appropriate constitution capable of downsizing an electric motor, which drives the compressor, with the use of the electromagnetic clutch and the reduction mechanism, enables to obtain the air conditioner for use in vehicles capable of performing with reason an air-conditioning function during stopping of the engine.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An air conditioner for use in vehicles comprising:
   a compressor connected to an engine driving a vehicle and operated by a driving force provided by said engine during operation of said engine, wherein in response to stopping of said engine,
   a connection between said engine and said compressor is released, and
   an electric motor, which drives said compressor, is connected to said compressor;
   said electric motor, which drives said compressor, is connected to an inverter, and receives an electric power supply via said inverter,
   said compressor being operated by said electric motor during stopping of said engine; and
   a separately provided motor generator receives an electric power supply via said inverter from a DC power supply to start said engine, and is driven by said engine during operation of said engine to perform a power generation function.

2. The air conditioner according to claim 1, wherein said electric motor is controlled in rotational speed by velocity control means, and drives said compressor at a predetermined rotational speed controlled by said velocity control means upon stopping of said engine.

3. The air conditioner for use in vehicles according to claim 1, further comprising a one-way clutch providing a connection between said compressor and said electric motor driving said compressor; and
   said one-way clutch holds the connection between said compressor and electric motor when said compressor is driven by said electric motor, and releases the connection between said compressor and electric motor when said compressor is driven by said engine.

4. The air conditioner for use in vehicles according to claim 2, further comprising a one-way clutch providing a connection between said compressor and said electric motor driving said compressor; and
   said one-way clutch holds the connection between said compressor and electric motor when said compressor is driven by said electric motor, and releases the connection between said compressor and electric motor when said compressor is driven by said engine.

5. The air conditioner for use in vehicles according to claim 1, further comprising an electromagnetic clutch and a reduction mechanism connecting said compressor to said electric motor driving said compressor; and
   said compressor is driven by said electric motor via said electromagnetic clutch and reduction mechanism during stopping of said engine.

6. The air conditioner for use in vehicles according to claim 2, further comprising an electromagnetic clutch and a reduction mechanism connecting said compressor to said electric motor driving said compressor; and
   said compressor is driven by said electric motor via said electromagnetic clutch and reduction mechanism during stopping of said engine.

7. The air conditioner for use in vehicles according to claim 1, wherein said motor generator receives the electric power supply via the inverter from the DC power supply to start said engine, at the same time the motor generator is driven by said engine during operation of said engine to perform a power generation function; and
   said electric motor, which drives said compressor, is connected to said inverter in response to stopping of said engine, and receives an electric power supply via said inverter.

8. The air conditioner for use in vehicles according to claim 5, wherein said reduction mechanism reduces input rotational speed from the electric motor.

9. The air conditioner for use in vehicles according to claim 3, wherein said one-way clutch is located between the motor generator and the compressor.

10. The air conditioner for use in vehicles according to claim 1, further comprising a first electromagnetic clutch located between the compressor and the engine and a second electromagnetic clutch located between the compressor and the electric motor.

11. The air conditioner according to claim 1, further comprising a first electromagnetic clutch located between the compressor and the engine and a second electromagnetic clutch located between the compressor and a reduction mechanism.

12. The air conditioner according to claim 1, further comprising a first electromagnetic clutch located between the compressor and the motor generator and a second electromagnetic clutch located between the compressor and the electric motor.

13. An air conditioner for use in vehicles comprising:
   a compressor connected to an engine driving a vehicle and operated by a driving force provided by said engine during operation of said engine, wherein in response to stopping of said engine,
   a connection between said engine and said compressor is released, and at the same time, an electric motor, which drives said compressor, is connected to said compressor, and
   said electric motor, which drives said compressor, is connected to an inverter, and receives an electric power supply via said inverter,
   said compressor being operated by said electric motor during stopping of said engine; and
   a separately provided a motor generator that receives an electric power supply via an inverter from a DC power supply to start said engine, and is driven by said engine during operation of said engine to perform a power generation function.

14. An air conditioner for use in vehicle comprising:
   a compressor connected to an engine driving a vehicle and operated by a driving force provided by said engine during operation of said engine, wherein in response to stopping of said engine, a connection between said engine and said compressor is released in response to stopping of said engine, and an electric motor, which drives said compressor, is connected to said compressor, wherein said compressor is operated by said electric motor during stopping of said engine; a first electromagnetic clutch located between the compressor and the engine and a second electromagnetic clutch located between the compressor and the electric motor; wherein said electric motor, which drives said compressor, is connected to an inverter, and receives an electric power supply via said inverter.

15. An air conditioner according to claim 14, wherein said first electromagnetic clutch is in an on state during starting of the engine and the second electromagnetic clutch is in an off state during starting of the engine.

* * * * *